US008598558B2

(12) United States Patent
Bloss et al.

(10) Patent No.: US 8,598,558 B2

(45) Date of Patent: Dec. 3, 2013

(54) SENSOR DEVICE FOR THE SPECTRALLY RESOLVED CAPTURE OF VALUABLE DOCUMENTS AND A CORRESPONDING METHOD

(75) Inventors: Michael Bloss, Munich (DE); Martin Clara, Munich (DE); Wolfgang Deckenbach, Schechen (DE)

(73) Assignee: Giesecke & Devrient GmbH, Munich (DE)

( * ) Notice: Subject to any disclaimer, the term of this patent is extended or adjusted under 35 U.S.C. 154(b) by 407 days.

(21) Appl. No.: 12/997,152

(22) PCT Filed: Jun. 4, 2009

(86) PCT No.: PCT/EP2009/004021

§ 371 (c)(1), (2), (4) Date: Dec. 9, 2010

(87) PCT Pub. No.: WO2009/152961

PCT Pub. Date: Dec. 23, 2009

(65) Prior Publication Data

US 2011/0085157 A1 Apr. 14, 2011

(30) Foreign Application Priority Data

Jun. 17, 2008 (DE) ......................... 10 2008 028 689

(51) Int. Cl.
*G06K 9/74* (2006.01)

(52) U.S. Cl.
USPC ................. 250/559.44; 250/559.45; 250/250; 250/458.1; 250/559.01

(58) Field of Classification Search
USPC .................... 250/271, 458.1, 559.01, 559.02, 250/559.03, 559.04, 559.05, 559.06, 250/559.07, 559.08, 559.09
See application file for complete search history.

(56) References Cited

U.S. PATENT DOCUMENTS 7,737,417 B2 * 6/2010 Giering et al. ............. 250/458.1
2003/0107004 A1 6/2003 Leach et al.

(Continued)

FOREIGN PATENT DOCUMENTS

DE 29 24 605 A1 4/1980
DE 10 2004 035 494 A1 2/2006

(Continued)

OTHER PUBLICATIONS

International Search Report in PCT/EP2009/004021, Sep. 22, 2009.

(Continued)

*Primary Examiner* — Tony Ko
(74) *Attorney, Agent, or Firm* — Workman Nydegger

(57) ABSTRACT

There is described a sensor device for spectrally resolved capture of optical detection radiation which emanates from a value document transported through a capture area of the sensor device in a predefined transport direction, comprising a detection device for spectrally resolved detection of the detection radiation in at least one predefined spectral detection range and emission of detection signals which represent at least one, in particular spectral, property of the detected detection radiation, at least one reference radiation device which emits optical reference radiation which is coupled into a detection beam path of the detection device at least partly in dependence on the position of a value document relative to the capture area, and which has a spectrum with a narrow band which is within the predefined spectral detection range, and/or at least one spectrum with an edge which is within the predefined spectral detection range, and a control and evaluation device which is configured for employing the detection signals which represent the property of the reference radiation, for checking and/or for adjusting the detection device and/or in the evaluation of detection signals which represent the at least one property of detection radiation emanating from the value document.

39 Claims, 5 Drawing Sheets

(56) References Cited

U.S. PATENT DOCUMENTS

Figure 1:
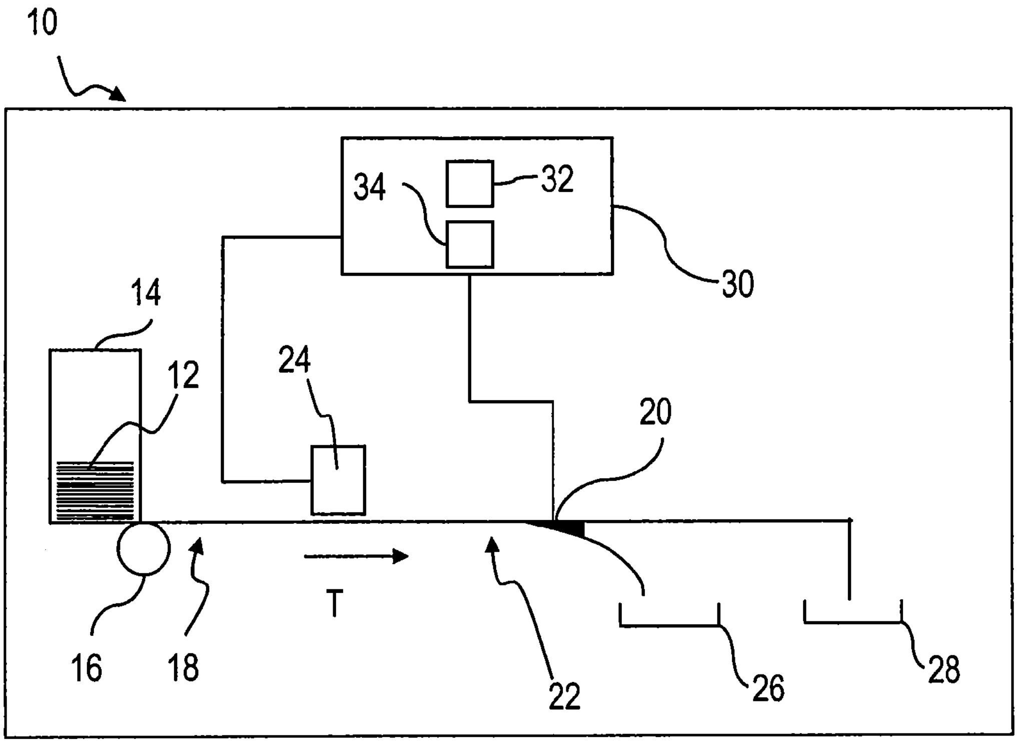

| | | | |
|---|---|---|---|
| 2004/0129893 | A1 | 7/2004 | Usami et al. |
| 2005/0052648 | A1 | 3/2005 | Frick et al. |
| 2005/0259250 | A1 | 11/2005 | Simon |
| 2008/0135780 | A1 | 6/2008 | Giering et al. |
| 2009/0174879 | A1 | 7/2009 | Bloss et al. |
| 2010/0060880 | A1 | 3/2010 | Bloss |

FOREIGN PATENT DOCUMENTS

| | | | |
|---|---|---|---|
| DE | 10 2005 040 821 | A1 | 3/2007 |
| DE | 10 2006 017 256 | A1 | 10/2007 |
| DE | 10 2006 045 624 | A1 | 4/2008 |
| DE | 10 2006 045 626 | A1 | 4/2008 |
| EP | 1 371 957 | A1 | 12/2003 |
| EP | 1 378 868 | A2 | 1/2004 |
| EP | 1 507 134 | A1 | 2/2005 |
| WO | 01/88846 | A1 | 11/2001 |
| WO | 2006/010537 | A1 | 2/2006 |

OTHER PUBLICATIONS

Lackner et al.: “Spektroskopischer Einstatz neuer lang-welliger (bis 2 μm) Diodenlaser (VCSEL) für schwierige Bedingungen” pp. 294-305 (2003).

* cited by examiner

SENSOR DEVICE FOR THE SPECTRALLY RESOLVED CAPTURE OF VALUABLE DOCUMENTS AND A CORRESPONDING METHOD

The present invention relates to a sensor device for spectrally resolved capture of optical detection radiation which emanates from a value document transported through a capture area of the sensor device in a predefined transport direction, and to a method for checking and/or adjusting a detection device of a sensor device for spectrally resolved detection of optical detection radiation in at least one predefined spectral detection range and emission of detection signals which represent at least one, in particular spectral, property of the detected detection radiation, and/or for making available data for evaluating detection signals.

Value documents are understood within the framework of the invention to be sheet-shaped objects that represent for example a monetary value or an authorization and hence should not be producible arbitrarily by unauthorized persons. Hence, they have features that are not easily produced, in particular copied, whose presence is an indication of authenticity, i.e. production by an authorized body. Important examples of such value documents are coupons, vouchers, checks and in particular bank notes.

Value documents, due to their value, involve a considerable incentive for forgery, i.e. for unauthorized production of documents with similar physical properties. To make such forgeries more difficult, value documents normally contain dyes and/or luminescent substances that are difficult to obtain and/or little known and have a characteristic remission spectrum or luminescence spectrum. For checking a value document for authenticity or the presence of a forgery, it is possible to capture optical radiation emanating from the value document in the by the characteristic part of the spectrum of the dye or luminescent substance by means of a sensor device and compare it to predefined spectra.

Such a check of the value documents can be effected in particular by machine, whereby the value documents are transported through a capture area of the sensor device. The capture area is defined here and hereinafter by the fact that radiation coming from said area is captured and detected or measured by the sensor device.

However, there is the problem that the detection properties of the sensor device can change in the course of time or upon longer operation. In particular, there can occur for example a shift of spectra to higher or lower wavelengths, i.e. a spectral line in the spectrum of a predefined substance can be detected at a wavelength that is shifted relative to the actual wavelength corresponding to the spectral line. This behavior can impair the differentiation of authentic and forged value documents. This disadvantage is aggravated by a corresponding shift not being recognized, or not early enough.

The present invention is hence based on the object of providing a sensor device for spectrally resolved capture of optical detection radiation which emanates from a value document transported through a capture area of the sensor device in a predefined transport direction, wherein a change of detection properties of the sensor device can be easily recognized and, preferably, such changes can be simply compensated at least partly. Further, a corresponding method is to be stated.

This object is achieved by a sensor device for spectrally resolved capture of optical detection radiation which emanates from a value document transported through a capture area of the sensor device in a predefined transport direction, comprising a detection device for spectrally resolved detection of the detection radiation in at least one predefined spectral detection range and emission of detection signals which represent at least one, in particular spectral, property of the detected detection radiation, at least one reference radiation device which emits optical reference radiation which is coupled at least partly into a detection beam path of the detection device according to or in dependence on the position of a value document relative to the capture area, and which has a spectrum with at least one narrow band which is within the predefined spectral detection range, and/or a spectrum with at least one edge which is within the predefined spectral detection range, and a control and evaluation device which is configured for employing the detection signals which represent the property of the reference radiation for checking and/or for adjusting the detection device and/or in the evaluation of detection signals which represent or constitute the at least one property of detection radiation emanating from the value document.

The sensor device is thus adapted to capture in spectrally resolved fashion optical properties along a transport path in a predefined transport direction of transported value documents. The actual capture is effected here by means of the detection device, which is configured for spectrally resolved detection of optical radiation emanating from the value document in the spectral detection range predefined for example in dependence on properties of the value documents to be analyzed, said radiation constituting the detection radiation. The predefined spectral detection range here is within the optical spectrum which comprises the visible spectral range and the IR and UV spectral ranges. A spectrally resolved capture is understood here to be in particular a capture effected over a continuous wavelength range or a capture effected over several, preferably more than eight, wavelength intervals. For generating the detection radiation, the value document can be illuminated for example with illumination radiation which is thrown back as detection radiation for example more or less diffusely without a wavelength change. When the value document is accordingly equipped with at least one luminescent feature, however, it can also be illuminated with illumination radiation that excites the value document to emit luminescence radiation which then forms the detection radiation.

The detection radiation passes here along the detection beam path from the capture area to the detection device, which captures the radiation in spectrally resolved fashion and emits corresponding detection signals which represent, i.e. describe or constitute, at least one property of the captured radiation. In particular, the detection device can possess along the detection beam path a device of the detection device that effects a spectral splitting, thereby forming spectral components from the detection radiation, and at least one receiving or detection element for capturing the spectral components.

The position of the capture area is given at least by the position and the configuration of the detection device. The transport path and the transport direction result inter alia from the position of the capture area, the requirement that a value document should enter the capture area without lateral deflection in the area directly therebefore, and, if the sensor device has several tracks, the position thereof.

When a value document is transported along the transport path to the sensor device, the detection device can capture the detection radiation of at least one value document portion which is located in the capture area.

The reference radiation device serves to emit reference radiation which is coupled into the detection beam path of the detection device and can thus be captured thereby in spectrally resolved fashion. The coupling in can be effected at an arbitrary point of the detection beam path that still permits a spectral detection, but the coupling in is preferably effected such that the reference radiation comes from the capture area. The beam path of the reference radiation is determined largely by the reference radiation device and preferably extends such that the reference radiation is coupled into the detection beam path in dependence on the position of a value document relative to the capture area. Depending on the embodiment of the reference radiation device and thus of the reference beam path, the coupling in can be effected either when no value document is located in the capture area, or when a value document is located in the capture area. In the first case the reference radiation passes at least partly directly into the detection beam path; in particular, the reference beam path can lead directly into the detection beam path. In the second case there can be effected a remission of the reference radiation through a value document portion located in the capture area, so that the remitted reference radiation passes into the detection beam path. Because the spectrum of the reference radiation is located at least partly within the spectral detection range of the detection device and thus of the sensor device, and is predefined or known, the reference radiation can be used for checking at least one optical, in particular spectral, property of the sensor device or detection device, for adjusting the sensor device or detection device and/or serve to make available data, in particular correction data, which are employed in an evaluation of detection signals in the analysis of a value document.

For this purpose, there is provided the control and evaluation device connected to the detection device via at least one signal connection. The control and evaluation device can be constructed in principle in arbitrary fashion and comprise in particular a processor, a memory in which there is stored a computer program upon whose execution by the processor the functions of the control and evaluation device are executed, an application-specific integrated circuit or a field programmable gate array (FPGA) or also combinations of said components.

The spectrum of the reference radiation is given by the configuration of the reference radiation device, as will be explained more closely. The control and evaluation device can employ the detection signals directly or after conversion to data which represent the property of the detection radiation.

The object is thus also achieved by a method for checking and/or adjusting a detection device of a sensor device for spectrally resolved detection of optical detection radiation in at least one predefined spectral detection range and emission of detection signals which represent at least one, in particular spectral, property of the detected detection radiation, and/or for making available data for evaluating detection signals, wherein a value document is transported through a capture area of the sensor device in a predefined transport direction, there is generated optical reference radiation which is coupled at least partly into a detection beam path of the detection device according to or in dependence on the position of a value document relative to the capture area, whereby the reference radiation has a spectrum with a narrow band which is within the predefined spectral detection range, and/or at least one spectrum with an edge which is within the predefined spectral detection range, there are generated detection signals which represent the property of the coupled in reference radiation, and the detection signals are employed for checking and/or for adjusting the detection device and/or for making available data for evaluating detection signals which represent the at least one property of detection radiation emanating from the value document.

The property of the reference radiation, and of the detection radiation in general, is understood within the framework of the invention to be a property representable by at least one numerical value.

A check is understood here, on the one hand, to mean that it is ascertained whether a value corresponding to the captured property of the reference radiation is within a predefined tolerance interval. According to the result of the ascertainment, a corresponding signal can then be generated. Within the framework of the invention the term "check" is also understood, on the other hand, to be a calibration. A calibration is understood to mean that under predefined conditions a relation or a deviation is ascertained between a value corresponding to the captured property of the reference radiation and a predefined, preferably known, value of the property of the reference radiation, and data representing the deviation or the relation are stored.

An adjustment, also as alignment, is understood to mean a change of the sensor device by which the deviation between a value corresponding to the captured property of the reference radiation and a predefined, preferably known, value of the property of the reference radiation is reduced as far as possible.

The captured property of the detection radiation can also be used, however, in accordance with an adjustment of the sensor device, for carrying out a correction upon the evaluation of detection signals. For this purpose it is possible, in the method, to ascertain data, hereinafter also designated as correction data, from the detection signals for the reference radiation, said data being stored in a memory, for example in the control and evaluation device, and later employed in the evaluation of detection signals upon the checking of value documents. The ascertainment of the data from the detection signals for the reference radiation can be effected by means of the control and evaluation device, which is configured accordingly for this purpose.

Through the use of the in particular narrow-band reference radiation or of reference radiation with an edge in the spectrum, it is possible to easily recognize changes of detection properties of the sensor device.

An especially exact check or calibration of the detection device or exact evaluation of the detection signals is made possible when, in the sensor device, the reference radiation device is so configured that the band of the reference radiation spectrum within the spectral detection range has a width smaller than 5 nm. Accordingly, in the method, there is preferably employed reference radiation in whose spectrum the band within the spectral detection range has a width smaller than 5 nm. The width of the band here is the full width at half the maximum intensity (FWHM).

As reference radiation devices there can be employed in principle arbitrary devices that emit optical radiation with the necessary spectrum. In particular, the reference radiation device can possess a reference radiation source which emits the reference radiation which, optionally after filtering, has the spectrum with a narrow band which is within the predefined spectral detection range, and/or at least one spectrum with an edge which is within the predefined spectral detection range. Through the direct generation of the reference radiation in the reference radiation source, it is possible to achieve a very long-lived stable generation of reference radiation of known properties, which is not necessarily the case when employing luminescence radiation of luminescent substances as the reference radiation. For example, the reference radiation device can have a reference radiation source, preferably a light-emitting diode or a laser diode, and a narrow-band filter downstream thereof for generating the narrow-band reference radiation. In the method, there can accordingly be generated optical radiation whose spectrum is at least partly within the spectral detection range, and the generated radiation narrow-band-filtered for forming the reference radiation.

Further, in the sensor device, the reference radiation device can comprise a temperature-stabilized edge-emitting laser diode as a source for the reference radiation. In the method, the reference radiation can then be generated by means of at least one temperature-stabilized edge-emitting laser diode. Corresponding devices are basically known. A corresponding device is described in the patent application DE 102005040821 A1.

As a further alternative, the reference radiation device can have, as a source for the reference radiation, an edge-emitting laser diode with a wavelength-selective optical resonator, in particular a resonator with a high quality factor. The resonator here has a natural frequency which corresponds to the desired wavelength.

For reducing temperature influences it is alternatively also possible to employ laser diodes with distributed feedback, so-called DFR laser diodes, or laser diodes with a distributed Bragg reflector, so-called DBR laser diodes, which for the purpose pursued here do not need to be equipped with a temperature stabilization.

An even simpler alternative, however, is that, in the sensor device, the reference radiation device comprises a surface-emitting laser diode as the source for the reference radiation. In the method, the reference radiation is then preferably generated by means of at least one surface-emitting laser diode. The use of such a laser diode offers not one but several advantages. Thus, such laser diodes have a very narrow-band emission spectrum, so that preferably between reference radiation device and detection device no filter or no reference substance is necessary for limiting the spectral bandwidth of the reference radiation. Further, the position of the band is relatively insensitive to temperature influences, compared to laser diodes of a different type, so that no temperature stabilization is necessary. Furthermore, the radiation emitted by surface-emitting laser diodes is not very divergent. This has the advantage that, in the sensor device, preferably in the beam path after the surface-emitting laser diode up to the detection device no focusing optical element or no luminescent substance needs to be provided, and is provided, for generating the reference radiation. The use of a surface-emitting laser diode or that of a DFR or DBR laser diode as the source of a reference radiation device is also expedient more generally. Hence, the subject matter of the present invention is also a sensor device for spectrally resolved capture of optical detection radiation which emanates from a value document transported through a capture area of the sensor device in a predefined transport direction, comprising a detection device for spectrally resolved detection of the detection radiation in at least one predefined spectral detection range and emission of detection signals which represent at least one, in particular spectral, property of the detected detection radiation, at least one reference radiation device which has a surface-emitting laser diode or a DFR or DBR laser diode as the reference radiation source and which emits optical reference radiation which is coupled into a detection beam path of the detection device at least partly independently of or in dependence on the position of a value document relative to the capture area, and which has a spectrum with a narrow band which is within the predefined spectral detection range, and a control and evaluation device which is configured for employing the detection signals which represent the property of the reference radiation, for checking and/or for adjusting the detection device and/or in the evaluation of detection signals which represent the at least one property of detection radiation emanating from the value document. Further, the subject of the invention is a method for checking and/or adjusting a detection device of a sensor device for spectrally resolved detection of optical detection radiation in at least one predefined spectral detection range and emission of detection signals which represent at least one, in particular spectral, property of the detected detection radiation, and/or for making available data for evaluating detection signals, wherein optical reference radiation is generated by means of a surface-emitting laser diode or a DFR or DBR laser diode and coupled at least partly into a detection beam path of the detection device independently of or in dependence on the position of a value document relative to the capture area, whereby the reference radiation has a spectrum with a narrow band which is within the predefined spectral detection range, there are generated detection signals which represent the property of the coupled in reference radiation, and the detection signals are employed for checking and/or for adjusting the detection device and/or for making available data for evaluating detection signals which represent the at least one property of detection radiation emanating from the value document. The reference radiation can accordingly be coupled in at any arbitrary point of the detection beam path. The hereinafter described developments and embodiments also apply accordingly to this subject matter.

In principle it is possible to employ arbitrary properties of the captured reference radiation that are represented by the detection signals. However, it is preferable in particular for capturing spectra that a reference radiation spectral property represented by the detection signals is employed in the checking or the adjustment or the evaluation. For this purpose, the detection device can be so configured that the detection signals represent a spectral property as the property, and the control and evaluation device be further configured for employing the reference radiation spectral property represented by the detection signals in the checking or the adjustment or the ascertainment of the data for the evaluation. In particular, it can ascertain whether the detection signals which represent the spectral properties of the reference radiation match, within a predefined tolerance range, the known or predefined corresponding properties of the reference radiation as were determined by the reference radiation device and optionally ascertained independently. As a spectral property there can be employed in particular the position of a maximum of the spectrum or the centroid ascertained over a predefined wavelength range around the band or the edge.

However, it is also possible alternatively or in combination to employ a reference radiation intensity represented by the detection signals in the checking or the adjustment or the ascertainment of the data for the evaluation. In the sensor device, the detection device can for this purpose be so configured that the detection signals represent the intensity as the property, and the control and evaluation device be further configured for employing the reference radiation intensity represented by the detection signals for the checking or the adjustment or the evaluation. In this manner it is for example also possible to ascertain the sensitivity of the detection device, because the absolute intensity values in the spectral detection range need not necessarily be employed in the evaluation of spectral properties.

In particular when an adjustment is desired, the detection device can, in the sensor device, possess a spectrographic device with a detection element array and a spatially dispersive device which spatially splits detection radiation into spectral components which fall on the detection element array, and the sensor device can further have at least one actuator drivable by the control and evaluation device and coupled mechanically with the detection element array, which is then movably mounted, or with at least one movably mounted optical element of the spectrographic device, said element at least partly determining the position of the spectral components on the detection element array, in particular a spatially dispersive device or an entrance slit. The control and evaluation device is then configured for driving the actuator in dependence on the detection signals for the coupled in reference radiation so as to reduce a deviation of a position of the spectral components of the reference radiation on the detection element array from a predefined position.

The properties of the detection device can depend on a number of factors. For example, in the method, the temperature of at least a part of the detection device and/or of a part of a reference radiation device employed for generating the reference radiation and/or of a temperature compensation element connected to the detection device and/or to the reference radiation device can be captured and employed in the checking or the adjustment or the ascertainment of the data for the evaluation. The sensor device can for this purpose have at least one temperature sensor connected to the control and evaluation device via a signal connection for capturing the temperature of at least a part of the detection device and/or of a part of the reference radiation device and/or of a temperature compensation element connected to the detection device and/or to the reference radiation device; the control and evaluation device can further be configured for also employing the captured temperature in the checking or the adjustment or the evaluation. In this manner it is possible to effect a separation of different influences on the sensor device.

A temperature influence need not occur only with the detection device, however. Thus, the temperature of at least a part of an illumination device for illuminating the capture area and/or of a temperature compensation element connected thereto can be captured and employed in the checking or the adjustment or the ascertainment of the data for the evaluation. The sensor device can then have an illumination device for illuminating at least a part of the capture area and at least one temperature sensor connected to the control and evaluation device via a signal connection for capturing the temperature of at least a part of the illumination radiation device and/or of a temperature compensation element connected thereto; the control and evaluation device can further be configured for employing the captured temperature in the checking or the adjustment or the evaluation. In this manner it is also possible to take an influence of the illumination device into consideration, whereby here the influence is not determinable by measurement employing the reference radiation and the detection device, however.

The invention can be used in principle for arbitrary sensor devices of the type stated at the outset. However, there is preferably employed as the detection device a detection device whose spectral detection range has a width of less than 400 nm. Accordingly, in the sensor device, the detection device can be so configured that the spectral detection range has a width of less than 400 nm.

The detection device can have arbitrary, in particular also known, devices or elements for splitting into spectral components. In particular, the detection device can have for example a diffractive element that is dispersive in the predefined spectral detection range. Examples of such elements are optical gratings, in particular also imaging gratings.

Alternatively or additionally, the detection device can have a refractive element that is dispersive in the predefined spectral detection range. An example of such an element is a suitable prism.

The detection device can have in principle arbitrary receiving or detection elements for capturing the components spectrally divided by the dispersive element, as long as they are sensitive in the necessary spectral range. Preferably, there is employed a locally resolving CMOS, NMOS or CCD array for detecting spectral components of the detection radiation and the reference radiation coupled into the detection beam path, or the corresponding spectral components. The sensor device can accordingly have a locally resolving CMOS, NMOS or CCD array for detecting spectral components of the detection radiation and the reference radiation coupled into the detection beam path. Such arrays are available readily and inexpensively.

Because the individual detection elements are read out successively in CCD arrays, it can prove favorable that, in particular for a quick detection, the detection device has an arrangement of individual detection elements whose signals are readable independently of each other, preferably in parallel. In the method, there is accordingly employed for detecting the detection radiation and reference radiation or their spectral components an arrangement of individual detection elements whose signals are read out independently of each other, preferably in parallel. This embodiment permits not only a quick readout, but also an adaptation of the sizes and properties of the individual detection elements according to the desired spectral sensitivity. Possibilities in this connection are described for example in the applicant's application WO 2006/010537 A1, whose content is to this extent included in the description by reference.

The reference radiation device is so configured and arranged that the reference radiation is coupled into the detection beam path in dependence on the position of the value document relative to the capture area. In this connection, in particular two possibilities are conceivable. On the one hand, through corresponding configuration and arrangement of the reference radiation device the reference radiation can, possibly after deflection, be coupled into the detection beam path out of the capture area, i.e. like normal detection radiation upon analysis of a value document. When a value document is located in the capture area, it shields off the reference radiation and the latter cannot be coupled into the detection beam path. For this purpose, there can for example be a source for the reference radiation arranged opposite the detection device with respect to a value document in the capture area. It is also possible, however, that the source for the reference radiation is arranged on the same side as the detection device with respect to a value document in the capture area and has an optical element arranged on the opposite side that deflects the reference radiation in the direction of the detection device. This alternative has the advantage that the reference radiation can be employed directly.

On the other hand, it is possible that the reference radiation device is so configured and arranged that the reference radiation illuminates a value document located in the capture area, and that the radiation emanating from the illuminated area, i.e. reference radiation remitted or thrown back by the value document, is coupled into the detection beam path. This alternative can be expedient when the sensor device is to be arranged only on one side of the transport path for lack of space.

The stated alternatives have the advantage that the reference radiation actually takes the same path as the detection radiation, thereby covering a large share of possible sources for disturbances of the detection device.

In particular, it is thus possible that the reference radiation is directed at least partly onto a transport path of the value document, so that said radiation is suitable for detecting a motion and/or a position of the value document relative to the capture area, and that before the capture of the property of the reference radiation and/or for the subsequent capture of the spectral property of a value document, radiation formed by the reference radiation is detected and is employed for detecting the motion and/or the position of the value document relative to the capture area and/or a value document is located at least partly in the capture area, or for ascertaining whether and/or when a value document enters the capture area. The sensor device can for this purpose have associated therewith a transport path which is provided for transporting a value document along the transport direction into the capture area, and the reference radiation device can be so configured and arranged relative to the capture area that its reference radiation is directed at least partly onto a transport path of the value document and is suitable for detecting a motion and/or a position of the value document relative to the capture area.

This configuration of the beam path of the reference radiation makes it possible to employ the reference radiation for determining the position or motion of a value document approaching the sensor device. In particular, the reference radiation source can be employed as the transmitter of a light barrier or of a light scanner. The light barrier can be configured as a reflective light barrier or a one-way light barrier.

For the receiver of the light barrier or of the light scanner there come into consideration at least two variants, which can be employed alone or in combination with each other.

On the one hand, for detecting a motion and/or a position of the value document relative to the capture area, it can be ascertained from detection signals from the detection device which represent the property of the reference radiation, whether and/or when a value document enters the capture area and/or a value document is located at least partly in the capture area. Further, in the sensor device, at least one portion of the detection device can serve as the receiver of a light barrier or of a light scanner, the transmitter of said barrier or scanner being formed by the reference radiation device; the control and evaluation device can further be so configured that it ascertains from the detection signals from the detection device as receive signals whether and/or when a value document enters the capture area and/or a value document is located at least partly in the capture area. The reference radiation source performs in this embodiment a double function, namely, that of a reference radiation source and that of a transmitter of a light barrier or of a light scanner. A light barrier is understood here to be a device that comprises a transmitter for emitting optical radiation along a light barrier beam path, a receiver for receiving the transmitter's radiation propagated along the light barrier beam path, and emitting corresponding receive signals, and an evaluation device connected at least to the receiver, which evaluates the receiver's receive signals as to whether or not optical radiation emitted by the transmitter is shielded off by an object along the barrier beam path and does not reach the receiver. Hence, a light barrier checks whether its beam path has been interrupted by an object. A light scanner, in contrast, has a transmitter for emitting optical radiation along a transmitting beam path, a receiver for receiving the transmitter's optical radiation which is remitted by an object out of the area of the transmitting beam path, and for emitting corresponding receiver signals, and an evaluation device connected to at least the receiver, which ascertains on the basis of the receiver signals whether an object is located in the transmitting beam path and emits a corresponding signal. This can considerably simplify the structure of the sensor device, in particular since a separate receiver for the light barrier or the light scanner is unnecessary and an additional alignment between transmitter and receiver is unnecessary.

On the other hand, for detecting a motion and/or a position of the value document relative to the capture area, there can be employed a detection element not belonging to the detection device and not receiving detection radiation, for converting reference radiation to electrical receive signals from which the position or motion of a value document is determinable; from the receive signals it can then be ascertained whether and/or when a value document enters the capture area and/or a value document is located at least partly in the capture area. The sensor device can then further have as the receiver of a light barrier or of a light scanner, the transmitter of said barrier or scanner being formed by the reference radiation device, a detection element not belonging to the detection device for converting reference radiation to electrical receive signals, which does not receive detection radiation.

In particular, the control and evaluation device can in both cases, in the sensor device, further be configured for ascertaining from the receive signals whether and/or when a value document enters the capture area and/or a value document is located at least partly in the capture area, and preferably emit a signal representing the result of the ascertainment. This embodiment has the advantage that the receiver can be configured, arranged and in particular adapted to its sole function, independently of the detection device.

Further, the control and evaluation device of the sensor device can evaluate the detection signals such that the detection of a motion and/or of a position of the value document relative to the capture area is effected before and/or after the ascertainment of at least one property of the reference radiation. The light barrier or the light scanner can thus be employed for controlling the check or the adjustment of the sensor device or the ascertainment of the data for evaluation. In particular, the method for checking and/or adjusting and/or ascertaining the data for evaluation can be performed after each recognition of an approach of a value document to, or of an entry of a value document into, the capture area. Thus, each value document can be checked with high quality independently of the number of value documents checked directly one after the other.

Said light barrier or the light scanner can, however, in particular also be used for controlling the capture of spectral properties.

Thus, the intensity of the reference radiation can be switched off or reduced for at least a predefined time period and/or in dependence on the detection signals and thereafter switched on or increased again, in dependence on the captured position or motion of the value document. In the sensor device, the control and evaluation device can for this purpose further be configured for switching on the reference radiation device to a resting state for at least a predefined time period and/or in dependence on detection signals from the detection device and thereafter to an operating state again, in dependence on the captured position or motion of the value document. The resting state is understood here to be a state of the illumination device in which the optical illumination radiation is not emitted or emitted with reduced intensity. In particular, the switching to the resting state can be effected after a predefined time interval, preferably in dependence on the transport speed; the time interval can be chosen such that a later detection of the spectral property of the value document is not disturbed.

Further, after a predefined time interval after recognition of an entry of a value document into the capture area, preferably, for illuminating the value document in the capture area, optical illumination radiation can be generated in a predefined spectral illumination range with a predefined minimum intensity and radiated into the capture area and, preferably when the value document exits the capture area, the optical illumination radiation be switched off or its intensity reduced. In the sensor device, the control and evaluation device can for this purpose be so configured that it switches an illumination device for illuminating the value document in the capture area with optical illumination radiation in a predefined spectral illumination range to an operating state after recognition of an entry of a value document into the capture area, after a predefined time interval, and switches it to a resting state preferably when the value document exits the capture area. The predefined time interval can be chosen in particular such that the capture of the property of the reference radiation can be effected during the time interval and/or a predefined area of the value document can be captured with the sensor device after expiry of the time interval. At least in the second case the duration of the time interval can be chosen in dependence on the transport speed.

Figure 2:
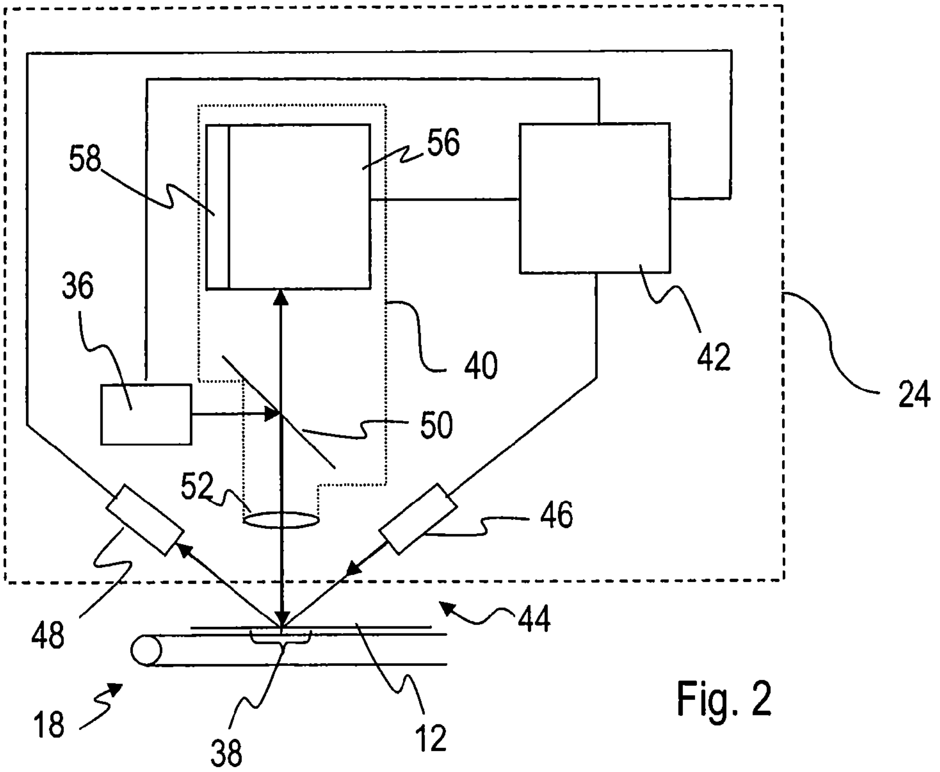
Figure 3:
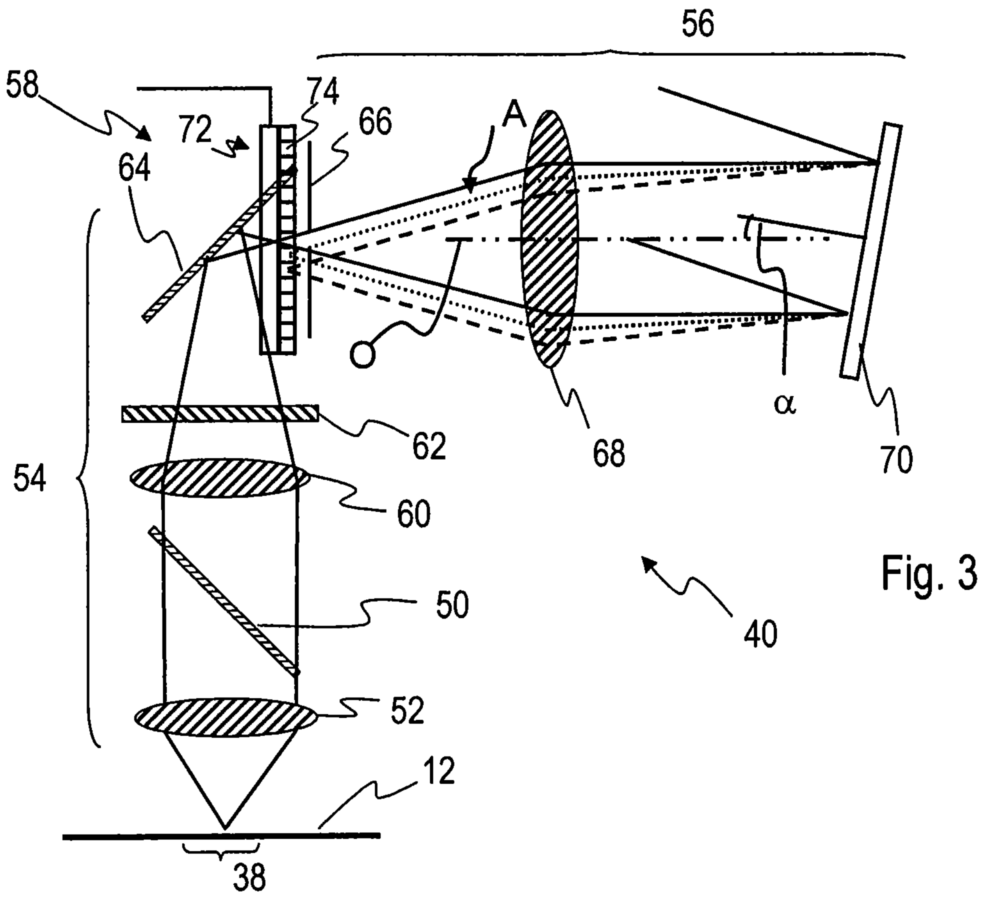
Figure 4:
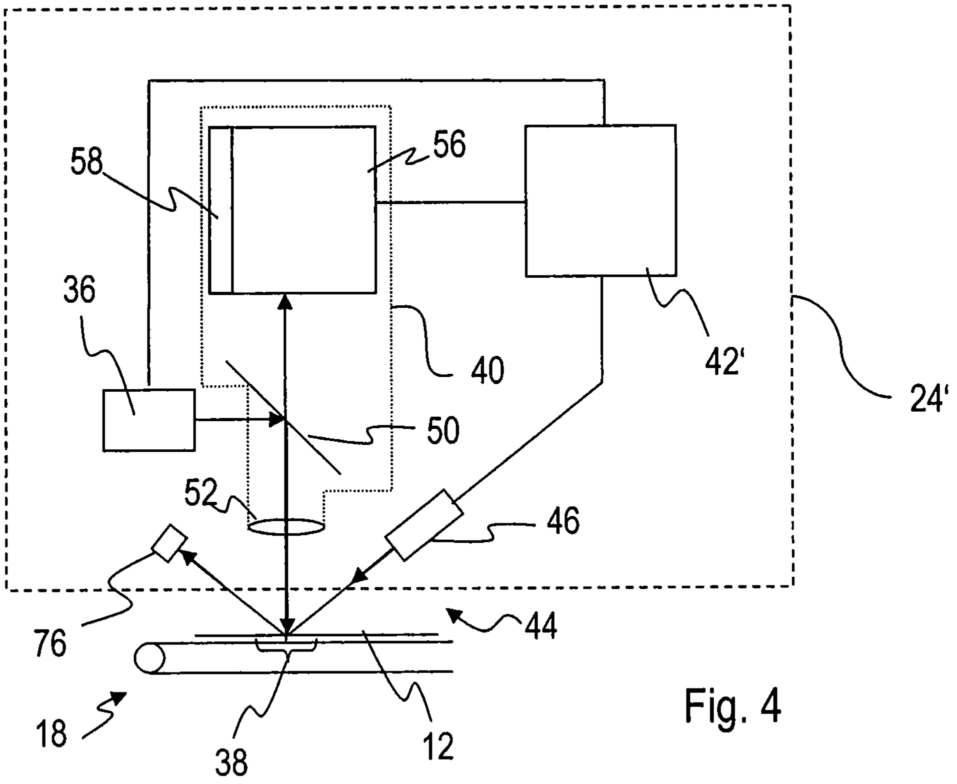
Figure 5:
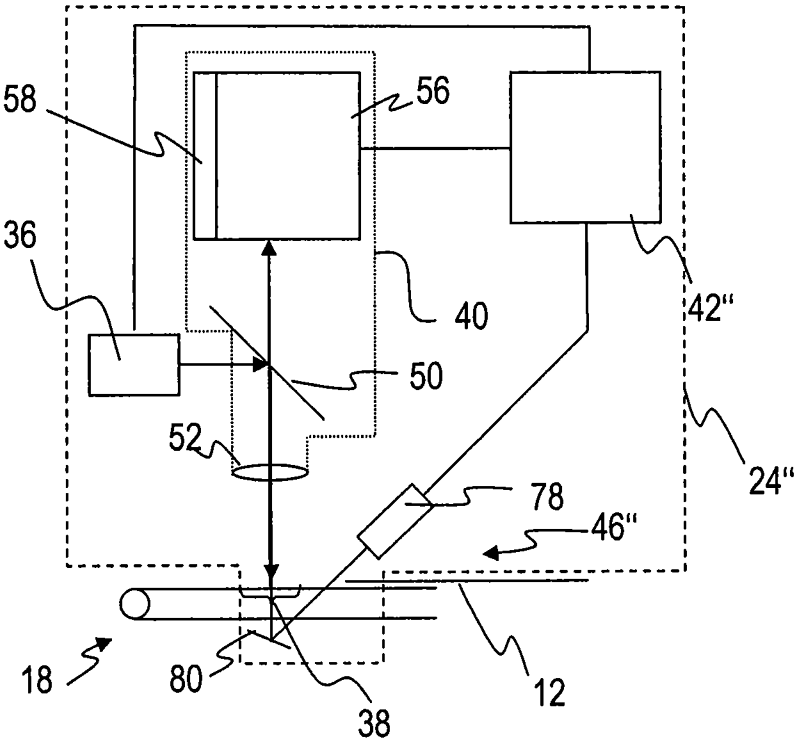
Figure 6:
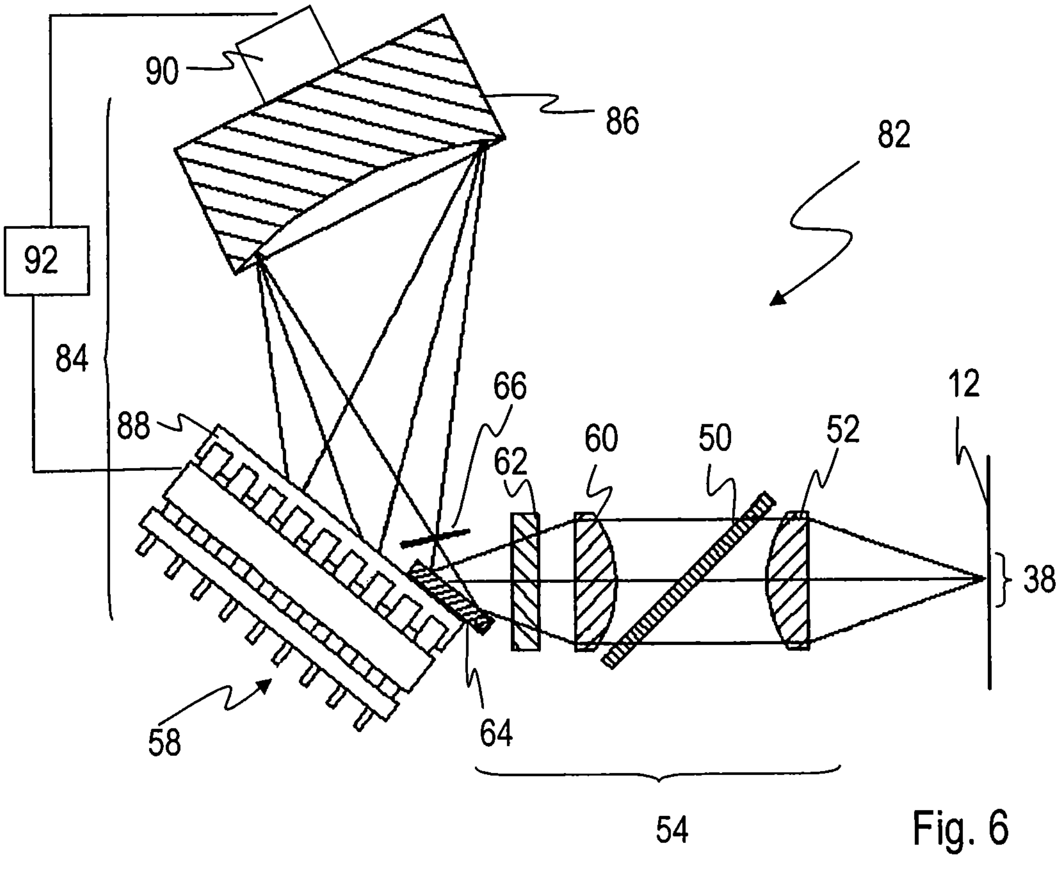
Figure 7:
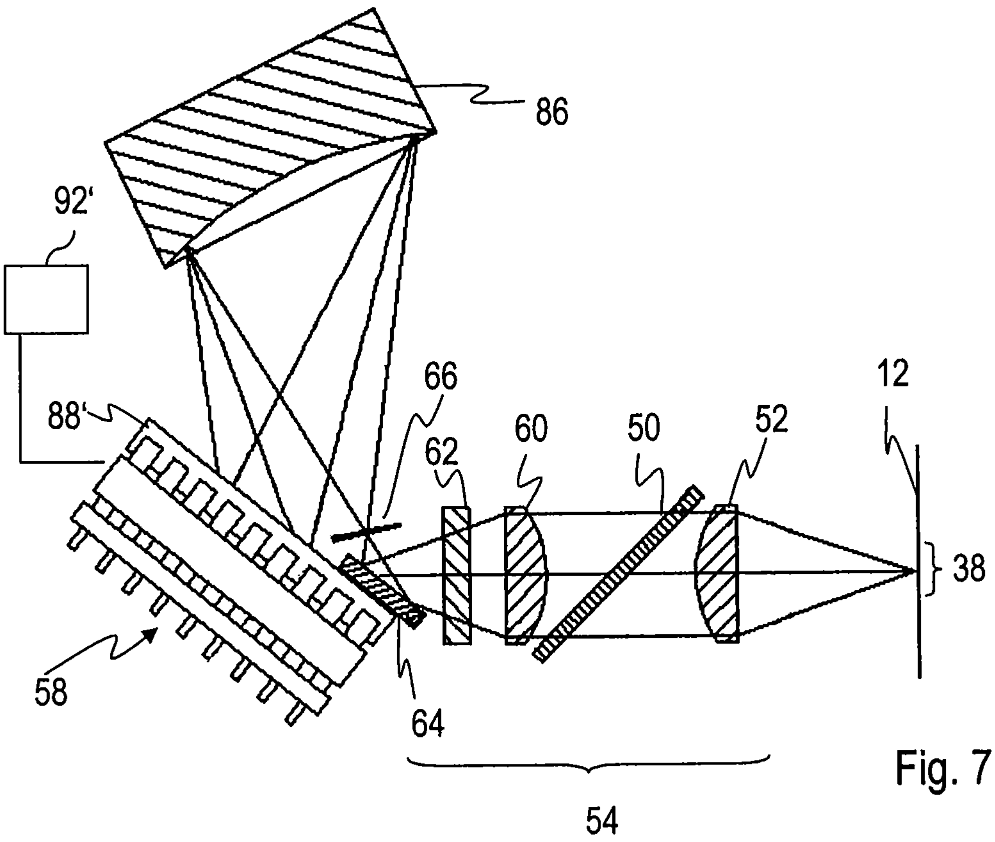
Figure 8:
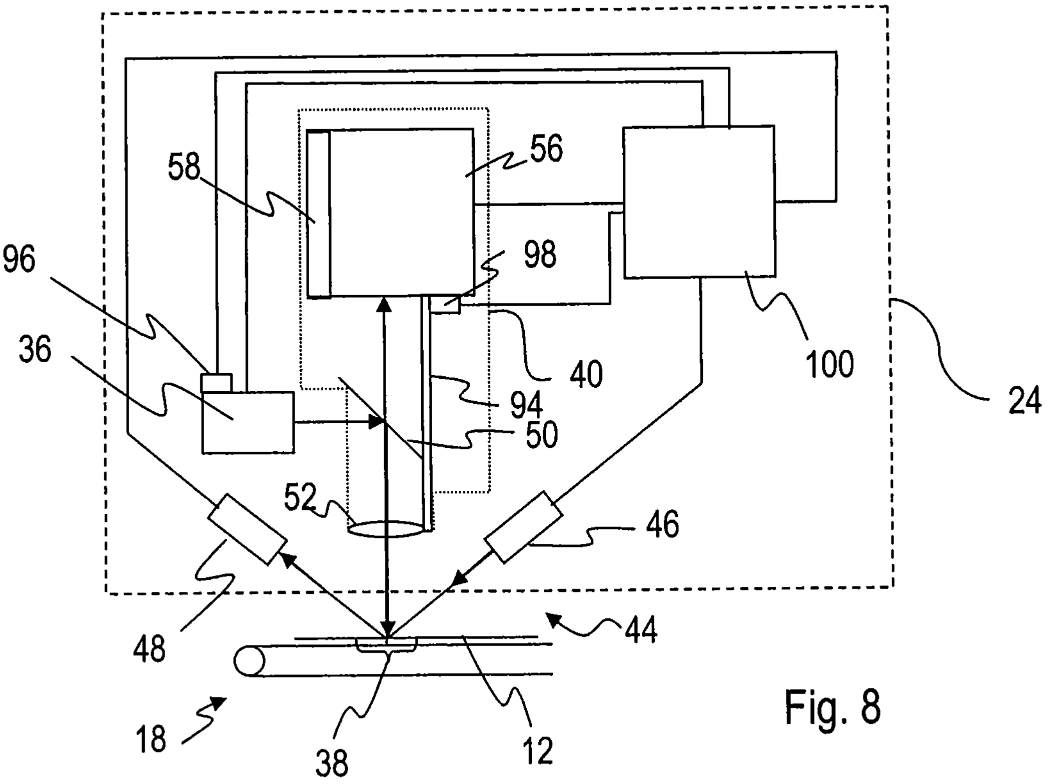
Figure 9:
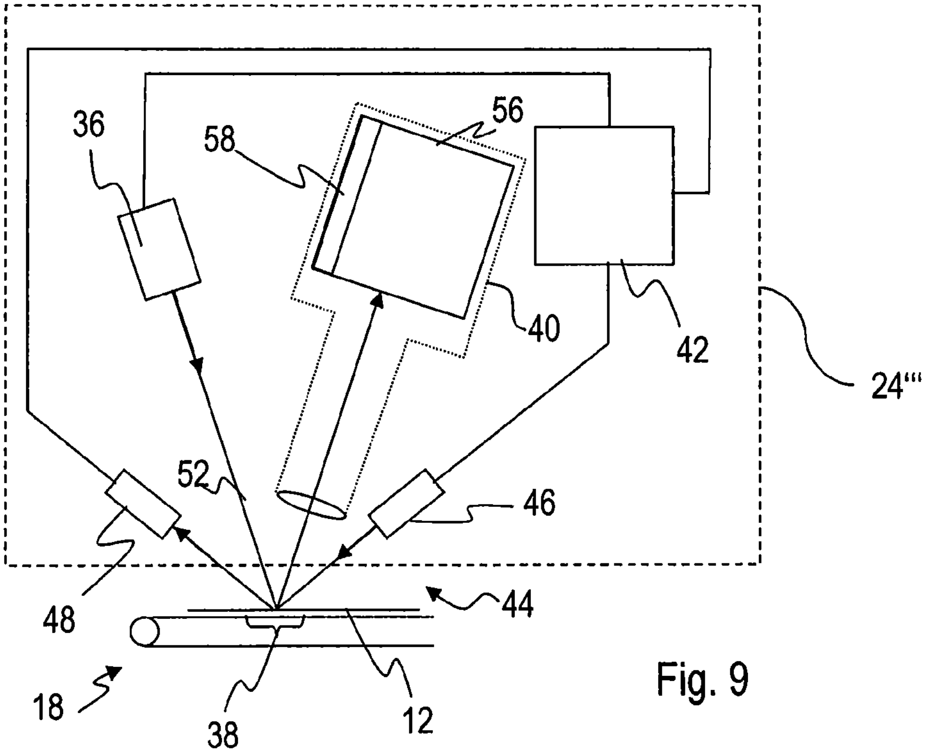
Figure 10:
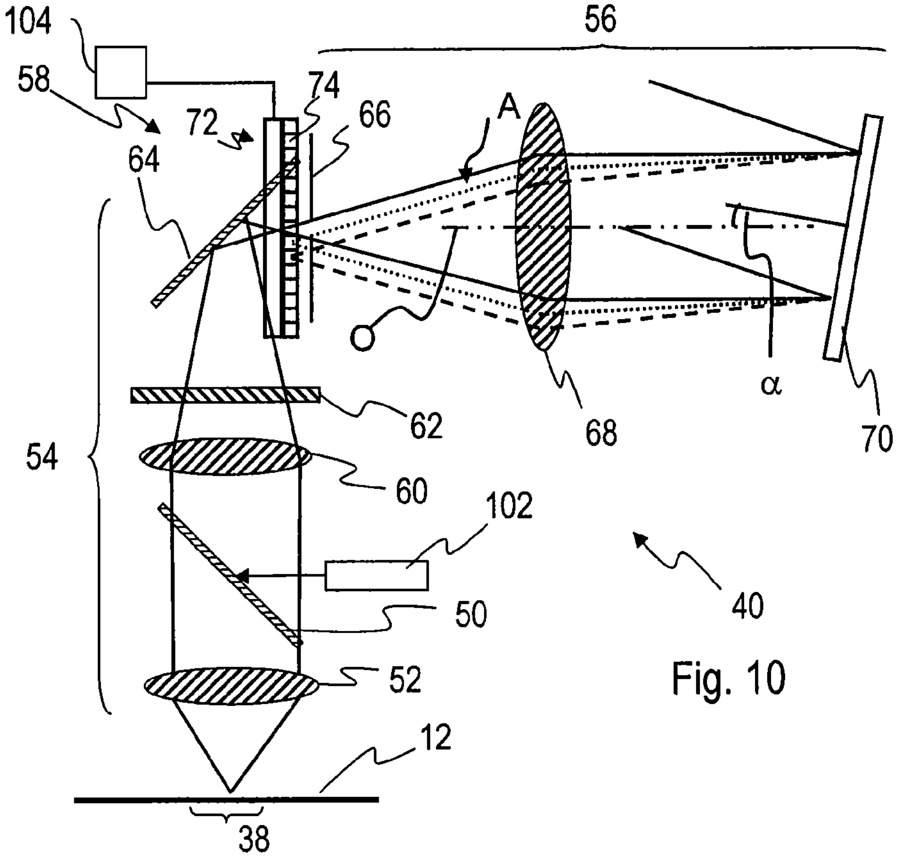

The invention will hereinafter be explained further by way of example with reference to the drawings. There are shown:

FIG. 1 a schematic view of a bank-note sorting apparatus,

FIG. 2 a schematic representation of a sensor device of the bank-note sorting apparatus in FIG. 1 with a portion of a transport device, FIG. 3 a schematic representation of a detection device of the sensor device in FIG. 2, FIG. 4 a schematic representation of a sensor device of a bank-note sorting apparatus according to a second embodiment with a portion of a transport device, FIG. 5 a schematic representation of a sensor device of a bank-note sorting apparatus according to a third embodiment with a portion of a transport device, FIG. 6 a schematic representation of a detection device of a sensor device of a bank-note sorting apparatus according to a fourth embodiment, FIG. 7 a schematic representation of a detection device of a sensor device of a bank-note sorting apparatus according to a fifth embodiment, FIG. 8 a schematic representation of a sensor device of a bank-note sorting apparatus according to a sixth embodiment, FIG. 9 a schematic representation of a sensor device of a bank-note sorting apparatus according to a seventh embodiment with a portion of a transport device, and FIG. 10 a schematic representation of a detection device of a sensor device of a bank-note sorting apparatus according to an eighth embodiment with a portion of a transport device.

A value document processing apparatus 10 in FIG. 1 which comprises an apparatus for optical analysis of value documents 12, in the example bank notes, has an input pocket 14 for inputting value documents 12 to be processed, a singler 16 which can access value documents 12 in the input pocket 14, a transport device 18 with a gate 20, and along a transport path 22 given by the transport device 18 an apparatus 24, arranged before the gate 20, for analyzing value documents, as well as after the gate 20 a first output pocket 26 for value documents recognized as authentic and a second output pocket 28 for value documents recognized as non-authentic. A central control and evaluation device 30 is connected at least to the analysis apparatus 24 and the gate 20 via signal connections and is used for driving the analysis apparatus 24, evaluating check signals of the analysis apparatus 24 and for driving at least the gate 20 in dependence on the result of the evaluation of the check signals.

The analysis apparatus 24 in connection with the control and evaluation device 30 is used for capturing optical properties of the value documents 12 and forming check signals representing said properties.

While a value document 12 is being transported past at a predefined trans-port speed in a transport direction T predefined by the transport path 22, the analysis apparatus 24 captures optical property values of the value document, whereby the corresponding check signals are formed.

From the check signals of the analysis apparatus 24 the central control and evaluation device 30 ascertains upon a check signal evaluation whether or not the value document is recognized as authentic according to a predefined authenticity criterion for the check signals.

The central control and evaluation device 30 has for this purpose in particular, besides corresponding interfaces for the sensors, a processor 32 and a memory 34 connected to the processor 32 and having stored therein at least one computer program with program code upon whose execution the processor 32 controls the apparatus or evaluates the check signals and drives the transport device 18 according to the evaluation.

In particular, the central control and evaluation device 30, more precisely the processor 32 therein, can check an authenticity criterion into which there enter for example reference data for a value document to be considered authentic which are predefined and stored in the memory 34. In dependence on the ascertained authenticity or non-authenticity, the central control and evaluation device 30, in particular the processor 32 therein, drives the transport device 18, more precisely the gate 20, such that the value document 12 is transported according to its ascertained authenticity for storage to the first output pocket 26 for value documents recognized as authentic, or to the second storage pocket 28 for value documents recognized as non-authentic.

The analysis apparatus 24 comprises a sensor device for spectrally resolved capture of optical detection radiation which emanates from a value document 12 trans-ported in the predefined transport direction T. In the example, the detection radiation is luminescence radiation in the invisible range of the optical spectrum.

The sensor device 24, designated hereinafter with the reference sign 24, is depicted more precisely in FIG. 2. It comprises an illumination device 36 for illuminating at least a part of a level capture area 38 in the transport path 22 into which value documents 12 to be analyzed pass via the transport path 22, and a detection device 40. A control device, in particular for driving the illumination device 36, and an evaluation device, in particular for processing and evaluating detection signals from the detection device 40, are combined in a control and evaluation device 42, in the example a programmed data processing device, which in this example comprises a processor (not shown) and a memory (not shown) in which there is stored a program executable by the processor for controlling the illumination device 36 and for evaluating the detection signals from the detection device 40. The control and evaluation device 42 is connected to the central control and evaluation device 30 via a signal connection.

Further, there is provided a light scanner 44 which has a transmitter 46 and a receiver 48 which are connected to the control and evaluation device 42 for driving the transmitter 46 or for evaluating signals from the receiver 48. In other embodiment examples, the evaluation of the signals from the receiver could also be effected through a separate light scanner controller whose output is then connected to the control and evaluation device 42.

The illumination device 36 serves to illuminate the capture area with optical radiation in a predefined wavelength range, in this example in the infrared, and has for this purpose as the illumination radiation source an array of like configured surface-emitting laser diodes ("vertical cavity surface emitting laser diode", VCSEL) which, in the example, are driven directly by the control and evaluation device 42 via a corresponding signal connection. Radiation emitted by said laser diodes, hereinafter designated as illumination radiation, is collected into a parallel ray bundle by a beam-concentrating optic (not shown) of the illumination device 36.

For illuminating the capture area 38, the illumination radiation is directed by a deflecting element 50 of the detection device 40, in the example a dichroic beam splitter which is reflective for the illumination radiation, to a focusing optic 52 which focuses the illumination radiation onto the capture area 38. When a value document 12 is located therein, the portion located in the capture area is illuminated with a corresponding illumination pattern.

Optical radiation excited by the illumination, in the case of an authentic value document 12 in the form of luminescence radiation, which is within a spectral detection range predefined by the type of value document or of the luminophores present therein, is emitted by the portion and passes as detection radiation into the detection beam path of the detection device 40.

The detection device 40 depicted more precisely in FIG. 3 for the embodiment example is used for spectrally resolved detection of the detection radiation in at least the predefined spectral detection range and emission of detection signals which represent at least one, in particular spectral, property of the detected detection radiation. Such a detection device is described more precisely in the applicant's German patent application with the official filing number 102006017256, whose content is hereby included in the description by reference.

In this embodiment example, the detection device 40 comprises for this purpose a detection optic 54, a spectrographic device 56 with a capture device 58 for spectrally resolved capture of spectral components generated by the spectrographic device.

The detection optic 54 has along a detection beam path, first, the focusing optic 52 which images the capture area to infinity, i.e. converts detection radiation coming from the capture area 38 to a parallel ray bundle, and the selectively transmissive deflecting element 50 which is transparent to radiation in the predefined spectral detection range. The detection optic 54 further comprises a condenser optic 60 for focusing the parallel detection radiation onto an entrance opening or an entrance slit of the spectrographic device 56. Between the condenser optic 60 and the spectrographic device 56 there are optionally arranged a filter 62 for filtering out unwanted spectral components from the detection beam path, in particular in the wavelength range of the illumination radiation, and a deflecting element 64, in the example a mirror, for deflecting the detection radiation by a predefined angle, in the example 90°.

The spectrographic device 56 has an entrance diaphragm 66 with a diaphragm aperture, being slit-shaped in the embodiment example, which constitutes an entrance slit and whose longitudinal extension runs at least approximately orthogonally to the plane defined by the detection beam path.

Detection radiation entering through the diaphragm aperture is concentrated to a parallel bundle by a collimating and focusing optic 68, which is achromatic in the example, of the spectrographic device 56. The collimating and focusing optic 68 is represented only symbolically as a lens in the figures, as are the other optics as well, but will actually often be executed as a combination of lenses. That this optic is achromatic is understood to mean that it is corrected with regard to chromatic aberrations in the wavelength range in which the spectrographic device 56 works. A corresponding correction in other wavelength ranges is unnecessary. The entrance diaphragm 66 and the collimating and focusing optic 68 are so arranged that the diaphragm aperture is located at least in good approximation in the focal plane, on the entrance diaphragm side, of the collimating and focusing optic 68.

The spectrographic device 56 further has a spatially dispersive device 70, in the example an optical reflection grating which decomposes incident detection radiation, i.e. optical radiation coming from the capture area, at least partly into spectrally separate spectral components propagated in different directions according to the wavelength.

The capture device 58 of the spectrographic device 56 possesses a detector arrangement 72 which is used for detection of the spectral components that is locally resolving in at least one spatial direction. Detection signals formed upon detection by the detector arrangement are supplied to the control and evaluation device 42, which captures the detection signals and carries out a comparison of the captured spectrum with predefined spectra on the basis of the detection signals. The control and evaluation device 42 is connected to the control device 10 to transmit thereto the result of the comparison via corresponding signals.

The spatially dispersive device 70 is, in the present example, a reflection grating with a line structure whose lines extend parallel to a plane through the longitudinal direction of the diaphragm aperture and an optical axis of the collimating and focusing optic 68. The line spacing is chosen such that the detection radiation in the predefined spectral detection range, in the example in the infrared, can be spectrally decomposed. The dispersive device 70 is for this purpose so oriented that the separate spectral components, in the example the first diffraction order, are focused by the collimating and focusing optic 68 onto the capture device 58, more precisely, the detector arrangement 72.

The detector arrangement 72 has a row-type arrangement of detection elements 74 for the spectral components, which is oriented at least approximately parallel to the direction of the spatial splitting of the spectral components, i.e. here the surface spanned by the spectral components, in this case, more precisely, a plane. At the same time, the spectral components are imaged by the collimating and focusing optic 68 onto the detector arrangement 72.

The detection elements 74 in row-type arrangement are so configured that their signals are readable independently of each other, preferably in parallel.

To achieve as compact a structure as possible, the dispersive device 70 is, on the one hand, inclined in two directions relative to the detector arrangement 72 and the direction of the incident detection radiation between the collimating and focusing optic 68 and the dispersive device 70. Because, in the embodiment example, the direction of the detection radiation between the collimating and focusing optic 68 and the dispersive device 70 extends parallel to the optical axis of the collimating and focusing optic 68, the level reflection grating 70 and thus also its line structure is firstly inclined relative to the optical axis O of the collimating and focusing optic 68 in the plane of the detection beam path. Hence, at least in the area between the dispersive device 70 and the collimating and focusing optic 68, the surface generated by the spectral components, in the example a plane, is inclined by the angle $\alpha$ relative to the direction of the detection radiation or the optical axis O of the collimating and focusing optic. In particular, a normal onto the level reflection grating 70 in the plane of the detection beam path is inclined by an angle $\alpha$ relative to the optical axis O of the collimating and focusing optic 68 (cf. FIG. 3). Secondly, the dispersive device 70, more precisely, the perpendicular of incidence for specular reflection, i.e. here the normal onto the plane of the line structure of the reflection grating 70, is inclined by an angle relative to the direction of the detection radiation or the optical axis O between the collimating and focusing optic 68 and the dispersive device 70, so that the first diffraction order falls on the detector arrangement 72.

On the other hand, the row of detection elements 74 of the detector arrangement is arranged at least approximately in a plane with the diaphragm aperture of the entrance diaphragm 66 and in a direction orthogonal to the plane defined by the directions of propagation of the spectral components, spaced from the diaphragm aperture, in FIG. 3 above the diaphragm aperture. In FIG. 3, the entrance diaphragm 66 and the receiving surfaces of the detection elements 74 are shown spaced-apart parallel to the focal plane of the collimating and focusing optic 68 for clarity's sake, but actually they are located substantially in a common plane. Regarded in the direction parallel to the row of detection elements 74, the diaphragm aperture is approximately in the middle of the row.

Upon detection, detection radiation emanating from a point on the value document 12 in the capture area 38 is thus concentrated along the detection beam path by the focusing optic 52 to a parallel bundle, which passes through the dichroic beam splitter, and is imaged by the condenser optic 60 onto the entrance diaphragm 66. The latter is imaged to infinity along the detection beam path by the collimating and focusing optic 68 onto the spatially dispersive device 70, which decomposes the radiation impinging thereon into spectral components. The spectral components of the first diffraction order are imaged onto the detector arrangement 72 again by the collimating and focusing optic 68, whereby there corresponds to each detection element 74 a wavelength or a wavelength range. A detection signal corresponding to the detection element represents in particular the intensity or power of the received spectral component. The detection device 40 emits detection signals corresponding to the spectral properties of the detection radiation to the control and evaluation device 42. The detection signals are received and evaluated by the control and evaluation device 42.

The light scanner 44 possesses as a transmitter 46 a surface-emitting laser diode which emits reference radiation in a narrow wavelength range with a full width at half maximum (FWHM) of 1 nm, which is within the predefined spectral detection range. For example, the maximum can be in the range of 760 nm, 808 nm, 948 nm or also 980 nm. The transmitter 46 serves as the reference radiation device and reference radiation source in this embodiment example. The laser diode 46 is directed onto the capture area 38 such that remitted reference radiation emanating from a portion, illuminated thereby, of a value document 12 in the capture area 38 passes into the detection beam path, i.e. is coupled thereinto. The reflected fraction of the reference radiation passes to the receiver 48, a photodetection element with an upstream diaphragm, which is sensitive in the range of the reference radiation, and emits corresponding signals upon impingement of reference radiation.

As evident from FIG. 2, reference radiation can only be coupled into the detection beam path and pass to the receiver when a portion of the value document 12 is located in the capture area 38. The coupling in thus depends on the position of the value document 12 relative to the capture area 38.

The sensor device 24 works as follows:

At first, the light scanner 44, the illumination device 36 and the detection device 40 are in the off state.

When the control and evaluation device 42 captures from a transport sensor (not shown) on the transport path a signal which indicates the arrival of a transported value document 12, the control and evaluation device 42 puts the transmitter 46, i.e. the reference radiation device, in the operating state in which it emits reference radiation into the capture area 38.

If the receiver 48 detects no reference radiation after a time duration chosen in dependence on the transport speed of the value documents, the control and evaluation device 42 puts the transmitter 46 back in the off state.

If a value document 12 is transported into the capture area as announced, however, a part of the reference radiation falling on the value document 12 is reflected in the direction of the receiver 48. When the receiver 48 detects reference radiation and emits a corresponding signal to the control and evaluation device 42, the latter switches on the detection device 40 and captures its detection signals at least for the detection elements on which spectral components of the reference radiation should fall in case of proper adjustment, and detection elements neighboring thereto.

Because the portion of the value document 12 in the capture area 38 is illuminated by the reference radiation, reference radiation that is remitted thereby, for example backscattered, passes into the detection beam path and is decomposed into spectral components which are focused onto the detector arrangement 72. The latter generates corresponding detection signals which represent or constitute spectral properties of the reference radiation, and emits them to the control and evaluation device 42.

The control and evaluation device 42 receives the detection signals for a predefined time period, for example a time period, chosen in dependence on the trans-port speed, which is necessary for capturing 1 mm of the value document, and ascertains whether the spectral property represented by the detection signals satisfies at least one predefined criterion. In the example, it checks whether the maximum of the detection radiation spectrum ascertained on the basis of the detection signals is within a predefined tolerance range from the maximum of the reference radiation spectrum given by the surface-emitting laser diode 46. If this is not the case, an error signal is output.

Otherwise, the transmitter 46 is switched off. After a predefined time period likewise chosen in dependence on the transport speed, in which detection signals are captured for determining offset values, and the offset values are determined, the illumination device 36 is switched on and the spectral properties of the value document are captured. There is associated with each of the detector elements of the detector arrangement a wavelength or a wavelength range.

After expiry of a further time period corresponding in dependence on the transport speed and the length of the longest one of the expected value documents in the transport direction, the illumination device 36 and the detection device 40 are switched off again.

A second embodiment example of a sensor device 24' schematically shown in FIG. 4 differs from the first embodiment example by the configuration of the light scanner and of the control and evaluation device 42. All the other parts are unchanged, so that the same reference signs are respectively employed for them as in the first embodiment example and the explanations thereon apply accordingly here as well.

In this embodiment example, the detection device 40 performs the role of the receiver of the light scanner. Instead of the light scanner 44 there is now provided only a radiation trap 76 for reference radiation reflected by a value document 12 in the capture area 38, which absorbs corresponding reference radiation.

The control and evaluation device 42' differs from the control and evaluation device 42 of the first embodiment example only in that it so drives the detection device 40, or so evaluates its detection signals, that the detection device 40 works as the receiver of the light scanner.

More precisely, it is configured for performing the following method.

When the control and evaluation device 42' captures from the transport sensor (not shown) on the transport path a signal which indicates the arrival of a trans-ported value document 12, the control and evaluation device 42' puts the transmitter 46, i.e. the reference radiation device, in the operating state in which it emits reference radiation into the capture area 38, and the detection device 40 in its operating state, if the detection device is not already being operated in continuous operation. From this time on, the control and evaluation device 42' captures detection signals emitted by the detection device 40.

If the detection device 40 detects no reference radiation after a time duration chosen in dependence on the transport speed of the value documents, and the control and evaluation device 42' accordingly captures no detection signals which are caused by the reference radiation, the control and evaluation device 42' puts the transmitter 46 back in the off state and switches off the detection device.

If a value document 12 is transported into the capture area 38 as announced, however, the portion of the value document 12 located in the capture area is illuminated by the reference radiation. The reference radiation scattered by the illuminating portion in the direction of the detection beam path is coupled into the detection beam path in the direction of the detection device 40 as a receiver, and decomposed into spectral components which are focused onto the detector arrangement 72. The detection device 40 generates corresponding detection signals which represent or constitute spectral properties of the reference radiation, and emits them to the control and evaluation device 42'. The control and evaluation device 42' captures said detection signals and first evaluates them only as to whether reference radiation was captured at all, and possibly ascertains that an object was captured by the light scanner.

The control and evaluation device 42' continues to receive the detection signals for a predefined time period, for example a time period, chosen in dependence on the transport speed, which is necessary for capturing 1 mm of the value document, and ascertains whether the spectral property represented by the detection signals satisfies at least one predefined criterion. In the example, it checks whether the maximum of the detection radiation spectrum ascertained on the basis of the detection signals is within a predefined tolerance range from the maximum of the reference radiation spectrum given by the surface-emitting laser diode 46. If this is not the case, an error signal is output to the central control and evaluation device 30, which drives a display of a corresponding error message on a display (not shown).

Otherwise, the transmitter 46 is switched off. The following steps correspond to those of the first embodiment example.

A third embodiment example for a sensor device 24", which is illustrated schematically in FIG. 5, differs from the second embodiment example only in that instead of a light scanner there is employed a light barrier. This means that the reference radiation device and the control and evaluation device are changed. All other parts are unchanged, so that the same reference signs are employed for the same parts and the explanations thereon apply here as well.

The reference radiation device 46" has, as in the first two embodiment examples, the same surface-emitting laser diode as a reference radiation source 78, and a deflecting element 80, in the example a mirror which deflects reference radiation emitted by the reference radiation source and couples it into the detection beam path when no value document is located in the capture area 38. For this purpose, the deflecting element is arranged on the side of the transport path opposing the detection device 40.

The control and evaluation device 42" is configured like the control and evaluation device 42' except for the modifications stated hereinafter. In particular, it is configured for performing the following steps.

When the control and evaluation device 42" captures from the transport sensor (not shown) on the transport path a signal which indicates the arrival of a transported value document 12, the control and evaluation device 42 puts the transmitter 46, i.e. the reference radiation device, in the operating state in which it emits reference radiation into the capture area 38, and the detection device 40 in its operating state, if the detection device is not already being operated in continuous operation. From this time on, the control and evaluation device 42" captures detection signals emitted by the detection device 40.

As long as no value document 12 is located in the capture area 38, the reference radiation emitted by the laser diode 78 and deflected by the deflecting element 80 is coupled into the detection beam path and decomposed into spectral components which are focused onto the detector arrangement 72. The detection device 40 generates corresponding detection signals which represent or constitute spectral properties of the reference radiation, and emits them to the control and evaluation device 42". The control and evaluation device 42" captures said detection signals and ascertains whether the spectral property represented by the detection signals satisfies at least one predefined criterion. In the example, it checks whether the maximum of the detection radiation spectrum ascertained on the basis of the detection signals is within a predefined tolerance range from the maximum of the reference radiation spectrum given by the surface-emitting laser diode 78. If this is not the case, an error signal is output.

Otherwise, the capture of detection signals is continued. Only when a value document enters the capture area 38 is the optical path from the deflecting element 80 to the detection device 40 interrupted. The control and evaluation device 42" can now no longer receive any detection signals which represent spectral properties of the reference radiation. Hence, it continually checks whether such signals are still present, and when they are no longer present it switches off the reference radiation device, in the example the reference radiation source 78, because it recognizes an entry of the value document into the capture area 38.

After a predefined time period, chosen in dependence on the transport speed, in which detection signals are captured for determining offset values, and the offset values are determined, the illumination device 36 is switched on and the spectral properties of the value document are captured as described in the first embodiment example.

After expiry of a further time period corresponding in dependence on the transport speed and the length of the longest one of the expected value documents in the transport direction, the illumination device 36 is switched off again and the reference radiation device 78 switched on.

A fourth embodiment example differs from the second embodiment example by the configuration of the detection device shown in FIG. 6 and that of the control and evaluation device. All the other parts are configured substantially unchanged relative or analogously to the second embodiment example, so that the same reference signs are respectively employed for such parts as in the second embodiment example.

The detection device 82 differs from the detection device 40, inter alia, in that instead of the collimating and focusing optic 68 in connection with the reflection grating 70 there is employed an imaging grating. Details on the detection device can be taken from the applicant's application WO 2006/010537 A1, whose total content is hereby included in the description by reference.

Like the detection device 40, the detection device 82 has the focusing optic 52, the deflecting element 50, the condenser optic 60, the filter 62 and the deflecting element 64, but somewhat rotated relative to the position in the first embodiment example, which are all configured as in the first embodiment example, so that the same reference signs are also employed for them as in the first embodiment example.

A spectrographic device 84 of the detection device 82 again has an entrance diaphragm 66 configured as in the first embodiment example, for which the same reference sign is employed as in the first embodiment example. As the spatially dispersive device there is employed an imaging grating 86 which at the same time performs a spectral decomposition of the impinging detection radiation by diffraction and, because it is configured as a concave mirror, an imaging of the entrance slit formed by the entrance diaphragm 66 for at least some of the spectral components of the detection radiation formed by said grating, onto a capture device 58. The capture device 58 possesses a row-type detector arrangement 88 of the spectrographic device 84 or of the detection device 82, which is configured like the detector arrangement 72.

Further, the detection device 82 has an adjustment device which makes it possible to change the position of the spectral components or of the images of the entrance slit of the entrance diaphragm for the spectral components on the detector arrangement 88.

On the one hand, for this purpose at least one suitable component of the spectrographic device is mounted movably, preferably without play.

On the other hand, the detection device 82 has an actuator (or actuating device) 90 which is coupled mechanically with the at least one component of the spectrographic device 84, in the example the spatially dispersive element 86, in order to change the position of a predefined spectral component generated by the spectrographic device, on the detector arrangement. The actuator 90 is connected for this purpose to the control and evaluation device via a signal connection and moves the at least one component of the spectrographic device, in the example the spatially dispersive element 86, in response to the actuating signals from the control and evaluation device.

In the example, the actuator 90 has a piezoelectric element which permits a very exact motion of the component in response to corresponding actuating signals. Although in principle a rotation of the imaging grating 86 would theoretically be more favorable for shifting the position of the spectral components on the detector arrangement 88, the component is so mounted and the actuator 90 so mechanically coupled with the component, in the present example, that the component can be moved linearly in a direction which extends orthogonally to the optical axis of the imaging grating and parallel to the splitting direction of the spectral components. This mounting is substantially simpler than a mounting which permits swiveling.

The control and evaluation device 92 differs from the control and evaluation device 42' in that it carries out not only a check of the detection device 82, but also an adjustment. It is configured in particular for carrying out the following method.

When the control and evaluation device 92 captures from the transport sensor (not shown) on the transport path a signal which indicates the arrival of a trans-ported value document 12, the control and evaluation device 92 puts the transmitter 46, i.e. the reference radiation device, in the operating state in which it emits reference radiation into the capture area 38, and the detection device 82 in its operating state, if the detection device is not already being operated in continuous operation. From this time on, the control and evaluation device 92 captures detection signals emitted by the detection device 82.

If the detection device 82 detects no reference radiation after a time duration chosen in dependence on the transport speed of the value documents, and the control and evaluation device 92 accordingly captures no detection signals which are caused by the reference radiation, the control and evaluation device 92 puts the transmitter 46 back in the off state and switches off the detection device.

If a value document 12 is transported into the capture area as announced, however, the portion of the value document 12 located in the capture area is illuminated by the reference radiation. The reference radiation scattered by the illuminating portion in the direction of the detection beam path is coupled into the detection beam path in the direction of the detection device 82 as the receiver of the light scanner, and decomposed into spectral components which are focused onto the detector arrangement 72. The detection device 82 generates corresponding detection signals which represent or constitute spectral properties of the reference radiation, and emits them to the control and evaluation device 92. The control and evaluation device 92 captures said detection signals and first evaluates them as to whether reference radiation was captured at all and, if this is the case, recognizes that an object was captured by the light scanner.

If an object, i.e. the value document, was captured by the light scanner, the control and evaluation device 92 continues to capture the following detection signals for a predefined time period, for example a time period, chosen in dependence on the transport speed, which is necessary for capturing 1 mm of the value document, and ascertains a deviation of the spectral property represented by the detection signals from the spectral property predefined for the reference radiation, said property being determined in the example by the surface-emitting laser diode 46. In the example, it ascertains more precisely the difference between the wavelengths of the maximum of the detection radiation spectrum ascertained on the basis of the detection signals, and of the maximum of the reference radiation spectrum given by the surface-emitting laser diode 46. In so doing, it need not necessarily ascertain the wavelengths explicitly, it is rather also possible to only form differences between the captured position of the maximum on the detector arrangement 88 and the predefined position of the maximum on the detector arrangement.

In dependence on the ascertained difference it now drives the actuator 90 such that the latter moves the component, here the dispersive element 86, so as to reduce the difference. For example, the amount of the shift can be chosen proportionally to the difference or be read out from a table in which the necessary shifts or actuating signals for predefined differences are stored. Such a table can be ascertained by experiment or computation.

Thus, an adjustment of the detection device is achieved.

Although a control thus only results for an individual value document, a result corresponding to a regulation of the detection device can be achieved upon analysis of several rapidly consecutive value documents, because the influences that cause an unwanted maladjustment only change much more slowly.

The following steps, i.e. the offset ascertainment and the capture of the detection signals which represent spectral properties of the luminescence radiation, correspond to those of the first embodiment example.

In another variant, there can be effected, instead of the displacement of the dispersive element, a displacement of the entrance diaphragm 66, more precisely, of the entrance slit.

In yet another variant, there is not moved at least one component of the spectrographic device, but rather the detector arrangement 88 is mounted so as to be linearly movable along its longitudinal direction and is coupled with a corresponding actuator for moving the detector arrangement.

A corresponding adjustability of the spectrographic device is also transferable to the other embodiment examples.

A fifth embodiment example in FIG. 7 differs from the fourth embodiment example, on the one hand, in that the imaging grating is retained and the actuator 90 is omitted and, on the other hand, by the configuration of the capture device 58, i.e. the detector arrangement 72 or the detector arrangement 88. Further, the control and evaluation device is modified relative to the fourth embodiment example. For the components that are unchanged relative to the fourth embodiment example, the same reference signs are employed as in the fourth embodiment example, and the explanations thereon apply accordingly here as well.

The detector arrangement 88' comprises a row-type CCD array which extends in its longitudinal direction parallel to the direction of the spatial splitting of the spectral components. The CCD array offers a high spatial resolution, in the example the row-type CCD array comprises 256 detector elements arranged in a row.

The control and evaluation device is now configured for ascertaining correction data which are employable for a correction of captured detection results. This is comparable to an adjustment of the sensor device.

In particular, the control and evaluation device 92' is configured for carrying out the following method.

When the control and evaluation device 92' captures from the transport sensor (not shown) on the transport path a signal which indicates the arrival of a trans-ported value document 12, the control and evaluation device 92' puts the transmitter 46, i.e. the reference radiation device, in the operating state in which it emits reference radiation into the capture area 38, and the detection device 82' in its operating state, if the detection device is not already being operated in continuous operation. From this time on, the control and evaluation device 92' captures detection signals emitted by the detection device 82'.

If the detection device 82' detects no reference radiation after a time duration chosen in dependence on the transport speed of the value documents, and the control and evaluation device 92' accordingly captures no detection signals which are caused by the reference radiation, the control and evaluation device 92' puts the transmitter 46 back to the off state and switches off the detection device 92'.

If a value document 12 is transported into the capture area 38 as announced, however, the portion of the value document 12 located in the capture area 38 is illuminated by the reference radiation. The reference radiation scattered by the illuminating portion in the direction of the detection beam path is coupled into the detection beam path in the direction of the detection device 82' as a receiver, and decomposed into spectral components which are focused onto the capture device 58 or the detector arrangement 88'. The detection device 82' generates corresponding detection signals which represent or constitute spectral properties of the reference radiation, and emits them to the control and evaluation device 92. The control and evaluation device 92 captures said detection signals and first evaluates them only as to whether reference radiation was captured at all, and possibly ascertains that an object was captured by the light scanner.

If an object, i.e. the value document, was captured by the light scanner, the control and evaluation device 92' continues to capture the following detection signals for a predefined time period, for example a time period, chosen in dependence on the transport speed, which is necessary for capturing 1 mm of the value document, and ascertains a deviation of the spectral property represented by the detection signals from the spectral property predefined for the reference radiation, said property being determined in the example by the surface-emitting laser diode 46. In the example it ascertains more precisely on the basis of the detection signals for the reference radiation the detection element which has captured the maximum intensity, i.e. the maximum of the spectrum. This is implicitly an ascertainment of an actual position of the maximum on a wavelength scale. It then stores correction data representing the position of the maximum or the deviation of the position of the maximum from the nominal position of the maximum upon perfect adjustment of the detection device 82'.

Alternatively, it could also ascertain the wavelength of the maximum and the deviation from the predefined wavelength of the maximum and store corresponding correction data.

The following step of offset ascertainment is effected as in the first embodiment example.

Then the illumination device 36 is switched on and the spectral properties of the value document are captured. There is associated with each of the detection elements of the detector arrangement a wavelength or a wavelength range. Upon the conversion of the detection signals to wavelengths there is now carried out, depending on the variant, a correction of the captured spectrum according to a shift in the wavelength dependence, employing the correction data. This can be effected for example by there being associated with each of the detection elements a corrected wavelength or a corrected wavelength range according to the ascertained deviation or according to the correction data. The resulting data can then be compared to predefined spectra of authentic value documents.

Alternatively, the predefined spectra could also be shifted employing the correction data, after a conversion of the detection signals to intensities as a function of the wavelength or the wavelength range has been effected.

After expiry of a further time period corresponding in dependence on the transport speed and the length of the longest one of the expected value documents in the transport direction, the control and evaluation device 92' switches off the illumination device 36 and the detection device 40 again.

A sixth embodiment example in FIG. 8 differs from the first embodiment example in that there are arranged on the illumination device 36 and a temperature compensation element 94 of the detection device 40, which is intended to dissipate heat from the optical components and the detector arrangement, temperature sensors 96 or 98 which capture a temperature of the illumination device 36 and of the temperature compensation element 94 and thus of the detection device 40, and emit corresponding temperature signals to the control and evaluation device 100 connected to the temperature sensors via signal lines.

The control and evaluation device 100 is a combination of the control and evaluation devices of the first and fifth embodiment examples. With regard to the function of the light scanner it is configured like the control and evaluation device 40 of the first embodiment example, and with regard to the ascertainment and storage of correction data and their use, like that of the fifth embodiment example. The control and evaluation device 100 is furthermore configured for capturing the temperature signals from the temperature sensors 96 and 98 and for employing them upon the ascertainment of the correction data as well as the ascertainment of the spectral properties of detection signals for detection radiation from a value document illuminated by means of the illumination device 36. For this purpose, the effects of the temperature changes are stored in the control and evaluation device 100 in the form of temperature correction data, which can be obtained by experiment or employing models for the illumination device and the detection device.

A seventh embodiment example in FIG. 9 differs from the first embodiment example only in that, with the sensor device 24''', the illumination radiation is radiated onto the value document obliquely and the detection radiation is captured accordingly obliquely.

An eighth embodiment example in FIG. 10 differs from the first embodiment example in that for checking there is arranged a surface-emitting laser diode 102 within the sensor device, whose reference radiation is coupled into the detection beam path of the detection device 82 by means of the accordingly configured deflecting element 64. The surface-emitting laser diode serving as the transmitter for the light scanner is replaced by a conventional edge-emitting laser diode.

The control and evaluation device 104 is changed relative to the control and evaluation device 42, on the one hand, in that the edge-emitting laser diode is employed for recognizing the entry of a value document into the capture area 38.

On the other hand, for the actual check after recognition of an entry of the value document into the capture area, the control and evaluation device 104 drives the surface-emitting laser diode 102, while it switches off the laser diode of the light scanner.

The other method steps are performed as in the first embodiment example.

In further embodiment examples, the control and evaluation device is changed to the effect that it ascertains, in addition to the spectral property of the reference radiation, also its total intensity and employs it upon the checking, the adjustment or the ascertainment of correction data.

In other embodiment examples, there can also be employed a detection device as described in WO 01/88846 A1 and which uses, inter alia, a two-dimensional CCD array as the detector arrangement.

Although the reference beam path and the detection beam path extend at least partly parallel to the same plane or in the same plane in the shown embodiment examples, this does not need to be the case. For example, it is also conceivable in the first embodiment example that the plane determined by the light scanner 44 and its beam path extends orthogonally to the plane of the detection beam path, shown in FIG. 1, of the illumination device and sensor device.

Further, the surface-emitting laser diode can be replaced in the embodiment examples by a temperature-stabilized edge-emitting laser diode, but the structure is then more complicated.

The invention claimed is:

1. A sensor device for spectrally resolved capture of optical detection radiation which emanates from a value document transported through a capture area of the sensor device in a predefined transport direction, comprising:

a detection device configured to detect spectrally resolved detection radiation in at least one predefined spectral detection range and to output detection signals which represent at least one property of the detected detection radiation;

at least one reference radiation device which emits optical reference radiation which is coupled into a detection beam path of the detection device at least partly in dependence on the position of a value document relative to the capture area, and which has a spectrum with at least one narrow band which is within the predefined spectral detection range, and/or a spectrum with at least one edge which is within the predefined spectral detection range, and which is detected by the detection device so that said detection signals also represent at least one property of the reference radiation; and a control and evaluation device configured to use a part of the detection signals which represent at least one property of the reference radiation to check and/or adjust the detection device and/or to evaluate a part of the detection signals which represent the at least one property of detection radiation emanating from a value document.

2. The sensor device according to claim 1, wherein the reference radiation device is configured so that the narrow band of the reference radiation spectrum within the spectral detection range has a width smaller than 5 nm.

3. The sensor device according to claim 1, wherein the reference radiation device comprises a surface-emitting laser diode as the source for the reference radiation.

4. The sensor device according to claim 3, wherein no focusing optical element is provided in the detection beam path after the surface-emitting laser diode up to the detection device.

5. The sensor device according to claim 1, wherein the reference radiation device comprises as the source for the reference radiation a temperature-stabilized edge-emitting laser diode or an edge-emitting laser diode with a wavelength-selective optical resonator.

6. The sensor device according to claim 1, wherein the detection device is configured so that the detection signals represent a spectral property as the property, and wherein the control and evaluation device is further configured to use the reference radiation spectral property represented by the detection signals upon the checking or the adjustment or the evaluation.

7. The sensor device according to claim 1, wherein the detection device is configured so that the detection signals represent signal intensity as the property, and wherein the control and evaluation device is further configured to use the reference radiation intensity represented by the detection signals upon the checking or the adjustment or the evaluation.

8. The sensor device according to claim 1, including at least one temperature sensor connected to the control and evaluation device via a signal connection, and configured to capture the temperature at least of a part of the detection device and/or of a part of the reference radiation device and/or of a temperature compensation element connected to the detection device and/or the reference radiation device, and wherein the control and evaluation device is further configured to use the captured temperature upon checking or adjustment or evaluation.

9. The sensor device according to claim 1, including an illumination device configured to illuminate at least a part of a capture area, and at least one temperature sensor connected to the control and evaluation device via a signal connection, arranged to capture the temperature of at least a part of the illumination radiation device and/or of a temperature compensation element connected thereto, and wherein the control and evaluation device is further configured to use the captured temperature upon checking or adjustment or evaluation.

10. The sensor device according to claim 1, wherein the detection device is configured so that the spectral detection range has a width of less than 400 nm.

11. The sensor device according to claim 1, wherein the detection device has a locally resolving CMOS, NMOS or CCD array.

12. The sensor device according to claim 1, wherein the detection device has an arrangement of individual detection elements whose signals are readable independently of each other.

13. The sensor device according to claim 1, wherein there is associated with the sensor device a transport path which is provided for transporting a value document along a transport direction into a capture area, and wherein the reference radiation device is so configured and so arranged relative to the capture area that its reference radiation is directed at least partly onto a transport path of a value document to enable detection of motion and/or a position of the value document relative to the capture area.

14. The sensor device according to claim 13, wherein at least one portion of the detection device serves as a receiver of a light barrier or of a light scanner, the transmitter of said barrier or scanner being formed by the reference radiation device, and wherein the control and evaluation device is further so configured that it uses the detection signals from the detection device as receive signals whether and/or when a value document enters the capture area and/or a value document is located at least partly in the capture area.

15. The sensor device according to claim 13, including, as a receiver of a light barrier or of a light scanner having as a transmitter the reference radiation device, a detection element not belonging to the detection device, and converts reference radiation to electrical receive signals, and which receives no detection radiation.

16. The sensor device according to claim 15, wherein the control and evaluation device is further configured to determine from the receive signals whether and/or when a value document enters the capture area and/or a value document is located at least partly in the capture area.

17. The sensor device according to claim 16, wherein the control and evaluation device is configured to evaluate the detection signals such that the detection of a motion and/or a position of the value document relative to the capture area is effected before and/or after ascertainment of at least one property of the reference radiation.

18. The sensor device according to claim 1, wherein the control and evaluation device is further configured to switch the reference radiation device to a resting state and thereafter back to an operating state, in dependence on the captured position or motion of a value document, for at least a predefined time period and/or in dependence on detection signals from the detection device.

19. The sensor device according to claim 1, wherein the control and evaluation device switches to an operating state an illumination device arranged to illuminate the value document in the capture area with optical illumination radiation in a predefined spectral illumination range after recognition of an entry of a value document into the capture area, and, after a predefined time interval, switches the illumination device to a resting state when the value document exits the capture area.

20. A sensor device for spectrally resolved capture of optical detection radiation which emanates from a value document transported through a capture area of the sensor device in a predefined transport direction, comprising:

a detection device configured to spectrally resolve detection of detection radiation in at least one predefined spectral detection range and to output detection signals which represent at least one property of the detected detection radiation;

at least one reference radiation device which has a surface-emitting laser diode or a DFR or DBR laser diode as the reference radiation source and which emits optical reference radiation which is coupled into a detection beam path of the detection device at least partly independently of or in dependence on the position of a value document relative to the capture area, and which has a spectrum with a narrow band which is within the predefined spectral detection range, and which is detected by the detection device so that said detection signals also represent at least one property of the reference radiation; and a control and evaluation device which is configured to use a part of the detection signals which represent the at least one property of the reference radiation to check and/or adjust the detection device and/or to evaluate the part of the detection signals which represent the at least one property of detection radiation emanating from a value document.

21. The sensor device according to claim 20, wherein the reference radiation of the reference radiation device is coupled into a detection beam path of the detection device at least partly in dependence on a position of a value document relative to the capture area.

22. A method for checking and/or adjusting a detection device of a sensor device for spectrally resolved detection of optical detection radiation in at least one predefined spectral detection range and emission of detection signals which represent at least one property of the detected detection radiation, and/or for making available data for evaluating detection signals, comprising:

transporting a value document through a capture area of the sensor device in a predefined transport direction;

generating optical reference radiation which is coupled at least partly into a detection beam path of the detection device in dependence on the position of a value document relative to the capture area, wherein the reference radiation has a spectrum with a narrow band which is within the predefined spectral detection range, and/or at least one spectrum with an edge which is within the predefined spectral detection range;

detecting said coupled in reference radiation by said detection device and including in said detection signals a representation of at least one property of the coupled in reference radiation; and using the detection signals to check and/or adjust the detection device and/or for making available data for evaluating detection signals which represent the at least one property of detection radiation emanating from the value document.

23. The method according to claim 22, including using reference radiation in whose spectrum the band within the spectral detection range has a width smaller than 5 nm.

24. The method according to claim 22, wherein the reference radiation is generated by means of at least one surface-emitting laser diode.

25. The method according to claim 22, wherein the reference radiation is generated by means of at least one temperature-stabilized edge-emitting laser diode.

26. The method according to claim 22, wherein a reference radiation spectral property represented by the detection signals is used upon checking or adjustment or ascertainment of the data for the evaluation.

27. The method according to claim 22, wherein a reference radiation intensity represented by the detection signals is used upon checking or adjustment or ascertainment of the data for the evaluation.

28. The method according to claim 22, wherein the temperature of at least a part of the detection device and/or of a part of a reference radiation device employed for generating the reference radiation and/or of a temperature compensation element connected to the detection device and/or the reference radiation device is captured and employed upon the checking or adjustment or ascertainment of data for the evaluation.

29. The method according to claim 22, wherein the temperature of at least a part of an illumination device illuminating the capture area and/or of a temperature compensation element connected thereto is captured and employed upon checking or adjustment or ascertainment of the data for the evaluation.

30. The method according to claim 22, including using as the detection device a detection device whose spectral detection range has a width of less than 400 nm.

31. The method according to claim 22, including using a locally resolving CMOS, NMOS or CCD array to detect spectral components of the detection radiation and the reference radiation coupled into the detection beam path.

32. The method according to claim 22, including using an arrangement of individual detection elements whose signals are read out independently of each other to detect detection and reference radiation.

33. The method according to claim 22, including directing the reference radiation at least partly onto a transport path of the value document, so that it is usable to detect a motion and/or a position of the value document relative to the capture area, and wherein radiation formed by the reference radiation is detected before the capture of the property of the reference radiation and/or for subsequent capture of the spectral property of a value document, and is used to detect the motion and/or the position of the value document relative to the capture area or to ascertain whether and/or when a value document enters the capture area and/or a value document is located at least partly in the capture area.

34. The method according to claim 33, including ascertaining from detection signals from the detection device which represent a property of the reference radiation to detect a motion and/or a position of the value document relative to the capture area, whether and/or when a value document enters the capture area and/or whether a value document is located at least partly in the capture area.

35. The method according to claim 33, including using a detection element not belonging to the detection device and not receiving detection radiation, and which converts reference radiation to electrical receive signals from which the position or motion of a value document is determinable to detect a motion and/or a position of the value document relative to the capture area, and wherein it is ascertained from the receive signals whether and/or when a value document enters the capture area and/or a value document is located at least partly in the capture area.

36. The method according to claim 33, wherein the intensity of the reference radiation is switched off or reduced for at least a predefined time period and/or in dependence on the detection signals and switched on or increased again thereafter, in dependence on the captured position or motion of the value document.

37. The method according to claim 33, wherein after a predefined time interval after recognition of an entry of a value document into the capture area, generating optical illumination radiation in a predefined spectral illumination range with a predefined minimum intensity and radiating the illumination into the capture area to illuminate a value document in the capture area, and switching off or reducing the intensity of the optical illumination radiation when the value document exits the capture area.

38. A method for checking and/or adjusting a detection device of a sensor device for spectrally resolved detection of optical detection radiation in at least one predefined spectral detection range and emitting detection signals which represent at least one property of the detected detection radiation, and/or for making available of data for evaluating detection signals comprising:

generating by means of a surface-emitting laser diode or a DFR or DBR laser diode optical reference radiation which is coupled at least partly into a detection beam path of the detection device independently of or in dependence on the position of a value document relative to a capture area, wherein the reference radiation has a spectrum with a narrow band which is within the predefined spectral detection range, and generating detection signals which represent at least one property of the coupled in reference radiation; and using the detection signals to check or adjust the detection device and/or to make available data for evaluating detection signals which represent the at least one property of detection radiation emanating from the value document.

39. The method according to claim 38, wherein the reference radiation is coupled at least partly into a detection beam path of the detection device in dependence on the position of a value document relative to the capture area.

* * * * *